(12) United States Patent
Schecter (10) Patent No.: US 9,843,503 B1
(45) Date of Patent: *Dec. 12, 2017

(54) ASYMMETRIC DYNAMIC ROUTING

(71) Applicant: CSC Holdings, LLC, Bethpage, NY (US)

(72) Inventor: Steven J. Schecter, Plainview, NY (US)

(73) Assignee: CSC Holdings, LLC, Bethpage, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 14/533,899

(22) Filed: Nov. 5, 2014

Related U.S. Application Data (63) Continuation of application No. 13/834,169, filed on Mar. 15, 2013, now Pat. No. 8,887,205.

(51) Int. Cl.
| | | |
|---|---|---|
| H04N 21/24 | (2011.01) | |
| H04L 12/707 | (2013.01) | |
| H04L 12/801 | (2013.01) | |
| H04W 28/10 | (2009.01) | |
| H04N 21/2385 | (2011.01) | |
| H04N 21/442 | (2011.01) | |

(52) U.S. Cl.
CPC .............. H04L 45/22 (2013.01); H04L 47/12 (2013.01); H04N 21/2385 (2013.01); H04N 21/24 (2013.01); H04N 21/2402 (2013.01); H04N 21/44209 (2013.01); H04W 28/10 (2013.01)

(58) Field of Classification Search
CPC .............. H04N 21/24; H04N 21/2402; H04N 21/2385; H04N 21/44209
See application file for complete search history.

(56) References Cited

U.S. PATENT DOCUMENTS

| | | | |
|---|---|---|---|
| 6,377,981 B1 * | 4/2002 | Ollikainen | H04B 7/18578 455/12.1 |
| 6,915,531 B2 * | 7/2005 | Yun | H04L 43/0817 348/E17.003 |
| 8,095,466 B2 * | 1/2012 | Kahn | G06Q 20/382 348/465 |
| 8,887,205 B1 | 11/2014 | Schecter | |
| 2005/0183130 A1 * | 8/2005 | Sadja | H04N 7/17309 725/107 |
| 2012/0042349 A1 * | 2/2012 | Ng | H04N 21/41407 725/109 |
| 2013/0219435 A1 * | 8/2013 | Pattison | H04N 21/4383 725/68 |

* cited by examiner

*Primary Examiner* — Robert Hance
(74) *Attorney, Agent, or Firm* — Sterne, Kessler, Goldstein & Fox P.L.L.C.

(57) ABSTRACT

A method for dynamic routing is provided. Status information of a multichannel video and data distribution service (MVDDS) channel from customer premises equipment (CPE) is received. The status information is evaluated to determine if data destined for the CPE over the MVDDS channel should be routed over a secondary channel. Data destined for the CPE is route over the secondary channel when the data is determined to be routed over the secondary channel.

20 Claims, 4 Drawing Sheets

ASYMMETRIC DYNAMIC ROUTING

CROSS-REFERENCE TO RELATED APPLICATIONS

This application is a continuation of U.S. patent application Ser. No. 13/834,169 filed Mar. 15, 2013 now U.S. Pat. No. 8,887,205, the entirety of which is incorporated herein by reference.

BACKGROUND OF THE INVENTION

Field of the Invention

Embodiments relate generally to dynamically routing communications.

Background Art

Some data service providers have recently begun exploring a variety of delivery mechanisms to provide data to their customers. In particular, these data service providers have been exploring wireless delivery mechanisms. For example, some wireless delivery mechanisms include 3G, WiMAX, and WiFi. However, these mechanisms suffer from a number of similar drawbacks, such as limited range, limited spectrum, and limited speeds. One particular wireless delivery mechanism is Multichannel Video and Data Distribution service (MVDDS). MVDDS is a type of wireless delivery service that has recently been explored by a variety of service providers. MVDDS provides for a faster downlink service than conventional wireless services. However, MVDDS only provides a downlink service and must be used in conjunction with a different uplink service, such as WiMAX, LTE, DSL, or 3G.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
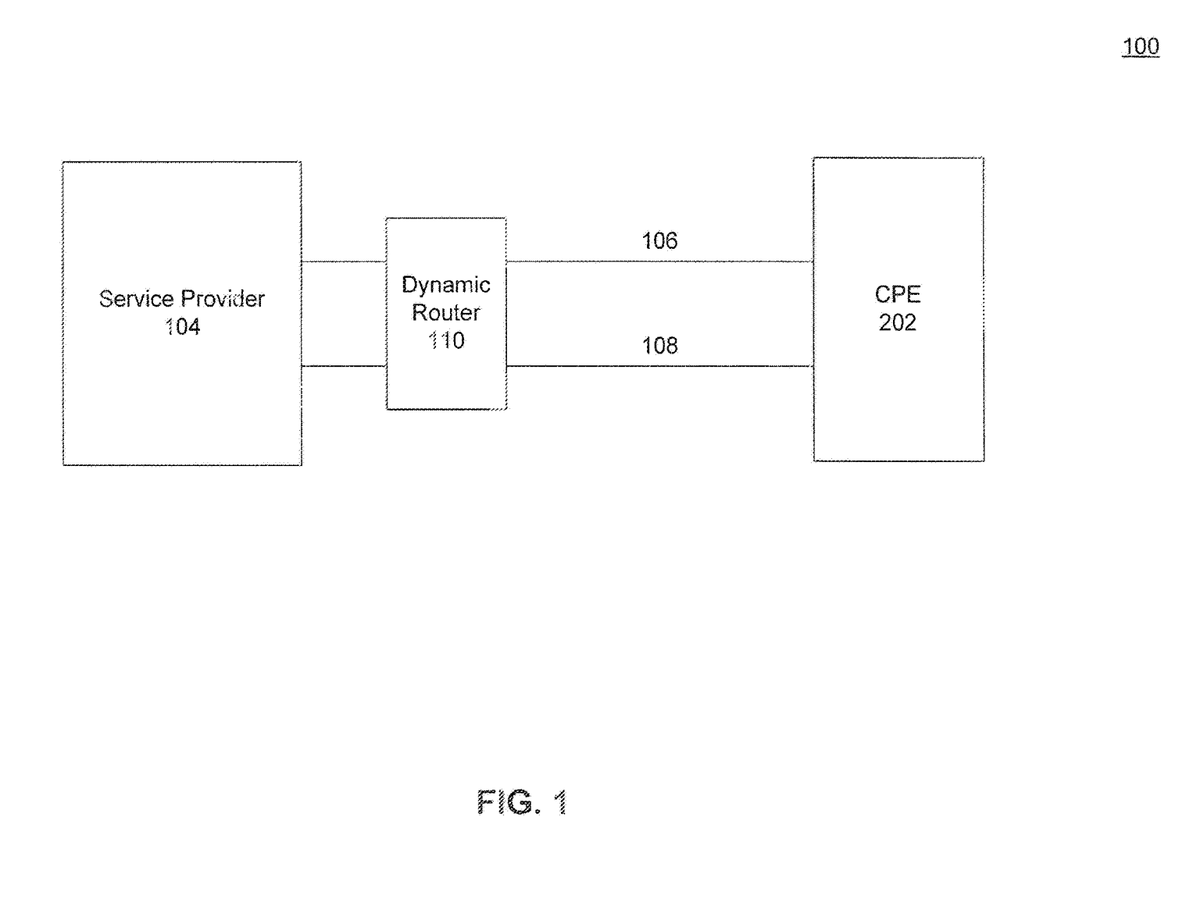
FIG. 1 is a block diagram of a system for multi video and data distribution services, according to an exemplary embodiment.

FIG. 1 is a block diagram of a system 100 for multi video and data distribution services, according to an exemplary embodiment.

System 100 includes a service provider 104 and customer premises equipment 102 (CPE). CPE 102 may be any type of device that may communicate with service provider 104. CPE 102 may be a modem, router, switch, or any other device for connecting with service provider 104. In an exemplary embodiment, CPE 102 may be configured to communicate with service provider 104 asymmetrically. For example, CPE 102 may be able to receive communications over one channel and send/receive communications on another channel. In particular, service provider 104 may send downstream data over MVDDS channel 106. MVDDS channel 106 may be a channel for sending unidirectional traffic at a high throughput. For example, MVDDS channel 106 may be used to send television signals or Internet traffic to CPE 102. CPE 102 may use a secondary channel 108 to communicate data to service provider 104. In an exemplary embodiment, secondary channel 108 may be a bidirectional communication channel for communicating data to and/or from service provider 104. However, while secondary channel 108 may be bidirectional, secondary channel 108 may also have certain characteristics that would cause service provider 104 to prefer sending data over MVDDS channel 106 than secondary channel 108. For example, secondary channel 108 may have characteristics such as slower throughput or higher data costs. In an exemplary embodiment, secondary channel 108 may be any type of communications channel, including but not limited to, WiMAX, 3G, LTE, DSL, or WiFi.

As with any communication medium, MVDDS channel 106 may become unavailable at certain times due to a variety of conditions. For example, service provider 104 may lose contact with CPE 102 over MVDDS channel 106 due to equipment problems, errors, outages, atmospheric conditions, or other conditions causing a communications failure. Likewise, at other times, while CPE 102 may not lose communication with service provider 104 over MVDDS channel 106, service may become degraded, such as experiencing slow throughput or poor signal reception. However, since MVDDS channel 106 is unidirectional, service provider 104 may not be able to determine that CPE 102 has lost communication or service has become degraded with service provider 104 over MVDDS channel 106. Thus, system 100 includes a dynamic router 110 for dynamically routing communications between MVDDS channel 106 and secondary channel 108 when the communications have become degraded or lost entirely.

Figure 2:
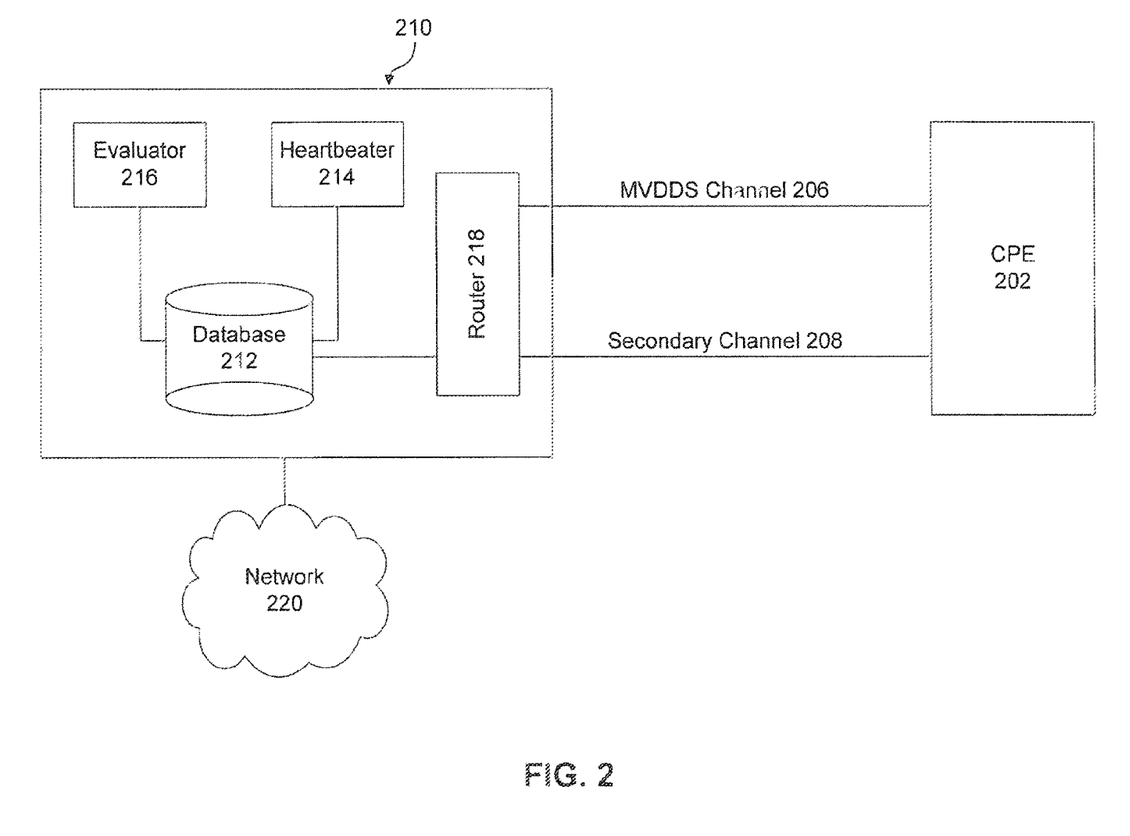
FIG. 2 is a block diagram of a dynamic router for dynamically routing communications between asymmetric communication channels, according to an exemplary embodiment.

FIG. 2 is a block diagram of a dynamic router 210 for dynamically routing communications between asymmetric communication channels, according to an exemplary embodiment. Dynamic router 210 may represent an exemplary embodiment of dynamic router 110.

Dynamic router 210 is connected to customer premises equipment (CPE) 202 over MVDDS channel 206 and secondary channel 208. MVDDS channel 206 may be configured for unidirectional communication, while secondary channel 208 may be configured for bidirectional communication. While FIG. 2 depicts a single CPE 202, a person of skill in the art would know that dynamic router 210, may be connected to a plurality of CPEs. Dynamic router 210 is also connected to network 220. Network 220 may be any type of communications network including, but not limited to, a Local Area Network (LAN), Wide-area Network (WAN), or the Internet. Dynamic router 210 may be configured to route communications from network 220 to CPE 202 and visa-versa. Dynamic router 210 may be implemented on any type of computing device, including, but not limited to, a personal computer, server, workstation, desktop, laptop, mobile device, router, specialized hardware, or any combination thereof.

In some cases, a service provider may prefer to send communications to CPE 202 over MVDDS channel 206 because of its high throughput and other desirable qualities. However, in some cases MVDDS channel 206 may become degraded or unusable due to various environmental factors, or other errors. Dynamic router 210 may be configured to detect such conditions and dynamically route data over either MVDDS channel 206 or secondary channel 208 based on these conditions. Typically, routers may make decisions as to whether to route data over a particular communication channel based upon link-state. However, link-state is limited to whether the communication channel is functioning or not functioning. Dynamic router 210 is configured to make routing decisions based upon additional factors besides link-state, such as signal strength. However, because MVDDS channel 206 is configured to be unidirectional, dynamic router 210 may not be able to sufficiently determine when MVDDS channel 206 has become degraded or unusable.

In an exemplary embodiment, dynamic router 210 also includes router 218. However, router 218 may also be located external to dynamic router 210. Router 218 may be implemented using hardware or may also be implemented in software. For example, router 218 may be implemented using off-the-shelf router hardware or software. Router 218 is configured to determine how to send data to and from network 220 to CPE 202. More particularly, router 218 may be configured to route communications over MVDDS channel 206 and secondary channel 208. Router 218 is configured to route these communications based on configuration data accessible to router 218. For example, router 218 may be configured with routing data. The routing data specifies how and under what circumstances data is routed over MVDDS channel 206 or secondary channel 208. The routing data may either be stored within router 218 or accessible to router 218 by being stored on remotely accessible storage, such as an external database. The routing data may also be able to be modified in real-time either remotely from router 218 (in the case where router 218 is external to dynamic router 210) or locally to router 218 (in cases where router 218 is included within dynamic router 210).

Dynamic router 210 also includes heartbeater 214 and evaluator 216. Heartbeater 214 may be configured to retrieve current status information from CPE 202 periodically. For example, at various predetermined intervals, heartbeater 214 may query CPE 202 for such information. However, according to an exemplary embodiment, CPE 202 may instead be configured to send status information to heartbeater 214 at various predetermined intervals or upon certain events, without being queried. For example, if CPE 202 detects that MVDDS channel 206 or secondary channel 208 has become unusable or degraded, CPE 202 may send status information to heartbeater 214. For example, CPE 202 may be configured with one or more redundant or tertiary channels, such that even if secondary channel 208 becomes degraded, CPE 202 may be able to send status information to heartbeater 214. The tertiary channel may be any type of wired or wireless communication medium including, but not limited to 3G, WiMax, LTE, WiFi, etc. The status information may relate to either MVDDS channel 206 or secondary channel 208 and may include not only link-state, but also other characteristics about MVDDS channel 206 and secondary channel 208, including, but not limited to, signal strength and throughput. In an exemplary embodiment, heartbeater 214 may query CPE 202 using simple network management protocol (SNMP) to receive the status information. For example, using SNMP, heartbeater 214 may be able to retrieve the signal strength, link-state, or current throughput of MVDDS channel 206. However, a person of ordinary skill in the art would know there may be other methods to retrieve status information from CPE 202. For example, CPE 202 may have a defined Application Programming Interface for retrieving such information.

There are several ways that heartbeater 214 may communicate with CPE 202. In exemplary embodiment, heartbeater 214 may query CPE 202 over MVDDS channel 206 and receive a response via secondary channel 208. However, according to an embodiment, heartbeater 214 may also be configured to send/receive responses over secondary channel 208 only. In an exemplary embodiment, heartbeater 214 may also be configured with a timeout for receiving status information from CPE 202. For example, if heartbeater 214 does not receive any information in response to its query to CPE 202, after a predetermined time, heartbeater 214 may determine that MVDDS channel 206 is either degraded or unusable.

In an exemplary embodiment, dynamic router 210 is configured to modify the routes in router 218 in real-time. More particularly, dynamic router 210 includes evaluator 216. Evaluator 216 is configured to determine based on the status information received from heartbeater 214 whether communications should be routed over MVDDS channel 206 or secondary channel 208. Evaluator 216 may make such determinations based on the status information received from CPE 202. For example, if the signal strength of the MVDDS channel 206 at CPE 202 is below a certain threshold, or if the MVDDS channel 206 link is down to CPE 202, evaluator 216 may make a determination that all communications (both downstream and upstream) should be routed over secondary channel 208. Evaluator 216 may also make routing decisions based on other factors, such as the amount of traffic on secondary channel 208, or real-time bandwidth costs. For example, if the throughput of MVDDS channel 206 is saturated, evaluator 216 may determine that subsequent communications should be routed over secondary channel 208 until the saturation ceases. Once evaluator 216 has determined that routes should be changed, then evaluator 216 may be configured to adjust the routes in router 218. In an exemplary embodiment, router 218 may include an Application Programming Interface (API), which allows for such adjustments. Alternatively, router 218 may have other mechanisms that allow for such adjustments, for example, remotely or locally accessible shells, web interfaces, databases, or routing files.

In an exemplary embodiment, heartbeater 214 may be connected to a database 212. Database 212 may be stored either within dynamic router 210 or on another device in communication with dynamic router 210. Database 212 may be any type of database, such as an SQL database, a plain text file, XML file, or any other set of data structures that may store and relate information. Database 212 may store information related to all or a portion of CPEs connected to a service provider. In some situations, if a service provider is connected to a large number of CPEs, the service provider may employ multiple heartbeaters or multiple dynamic routers. In such cases, database 212 may only store a subset of CPEs in order to lessen the load placed on any one particular dynamic router or heartbeater. Database 212 stores identification information regarding CPEs that instructs heartbeater 214 how to communicate with a particular CPE, such as CPE 202. For example, database 212 may store an IP address or other information which identifies how to contact CPE 202 (e.g. using a particular IP address). In addition, database 212 may store make/model information regarding CPE 202, which may aid in determining the optimal method for retrieving status information from CPE 202 (e.g. SNMP or another method). Accordingly, dynamic router 210 may be able to retrieve status information from a wide variety of make/models of CPEs. Using database 212, heartbeater 214 may determine which CPEs to contact and how to contact them. After the status information has been retrieved, heartbeater 214 may also be configured to record the status information in database 212 related to each respective CPE stored therein. The status information, for example status information associated with CPE 202 may then be retrieved later by querying database 212 for CPE 202.

In an exemplary embodiment, router 218 may also be configured to determine routing information in real-time by querying database 212. In such a case, database 212 may be optimized for fast querying and stored on a storage medium that has fast read times, such as random access memory, cache, or flash memory. More particularly, when data reaches router 218 intended for CPE 202, the data may be routed over MVDDS channel 206 or secondary channel 208. Router 218 may query database 212 to determine how to route the data. For example, router 218 may use evaluator 216 to determine the proper route by querying database 212 for the status information associated with CPE 202. Alternatively, evaluator 216 may be configured to store the determination in database 212 after the status information has been retrieved. For example, after heartbeater 214 receives the status information, evaluator 216 may make a routing decision and store the decision in database 212 associated with CPE 202. When router 218 receives the data to be routed to CPE 202, router 218 may query database 212 for CPE 202, retrieve the routing determination, and route over the proper channel based on the determination retrieved from database 212.

Figure 3:
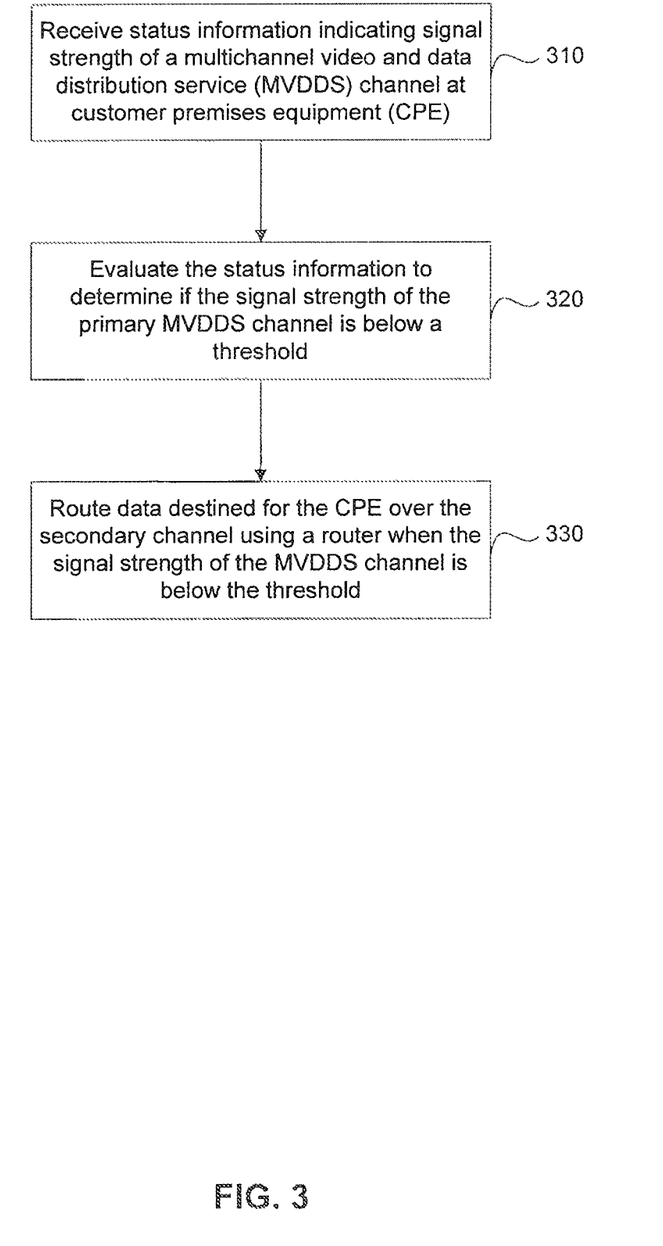
FIG. 3 is a flow diagram of a method for asymmetric dynamic routing, according to an exemplary embodiment.

FIG. 3 is a flow diagram of a method 300 for asymmetric dynamic routing, according to an exemplary embodiment.

At block 310 of method 300, status information indicating signal strength of a multichannel video and data distribution service (MVDDS) channel is received from customer premises equipment (CPE). The status information may also indicate other information, for example, quality of service, service flow, throughput, or any other information for which routing decisions could be made, according to an exemplary embodiment. In an exemplary embodiment, status information may also be received regarding a secondary channel. The CPE may be a modem, router, switch, or other device for connecting with a service provider. In an exemplary embodiment, the CPE may be able to receive communications over one channel and send/receive communications on a secondary channel. For example, the service provider may send all downstream communications over an MVDDS channel. The secondary channel may be used for upstream communications (i.e. communications from the CPE). In an exemplary embodiment, the secondary channel is a bidirectional communication capable of communicating data to/from the service provider. However, the secondary channel may also have certain characteristics that would cause service provider to prefer sending data over MVDDS channel than the secondary channel. While the service provider may prefer to send data downstream over MVDDS channel, under some circumstances MVDDS channel may become degraded or unusable.

In order to determine the health of the MVDDS channel or secondary channel, status information may be retrieved from the CPE about the signal strength of each respective channel. The status information may be received by a heartbeater, such as heartbeater 214 of FIG. 2. The status information may be retrieved from the CPE periodically. However, according to an exemplary embodiment, the CPE may be configured to send status information at various predetermined intervals or upon certain events. For example, if the CPE detects that the MVDDS channel or the secondary channel has become unusable or degraded, the CPE may send status information. The status information may include not only link-state, but also other characteristics about the MVDDS channel and the secondary channel, including, but not limited to, signal strength and throughput. In an exemplarily embodiment, the CPE may be queried using simple network management protocol (SNMP) to receive the status information. However, a person of ordinary skill in the art would know there may be other methods to retrieve status information from the CPE.

There are several ways the status information may be communicated from the CPE. In exemplary embodiment, the CPE may be queried over the MVDDS channel and response may be sent from the CPE over the secondary channel. However, according to an exemplary embodiment, the query and response may also be sent entirely over the secondary channel. A timeout may also be configured for receiving status information from the CPE. If the timeout occurs, it may be assumed the MVDDS channel is degraded or unusable.

At block 320, the status information is evaluated to determine if the signal strength of the MVDDS channel is below a threshold. The status information may be evaluated by an evaluator, such as evaluator 216 of FIG. 2. The status information received may include an indication of the signal strength of the MVDDS channel or the secondary channel. The signal strength may be indicated in decibels or any other suitable indicator of strength. In an exemplary, embodiment, the status information may also include link state and/or throughput information. This additional information may also be evaluated when making routing decisions. As discussed previously, due to certain environmental or other conditions, MVDDS channel may become unusable, unstable, or degraded. In such cases, a service provider may desire to route all communications over secondary channel, while MVDDS channel is degraded or unusable.

At block 330, the data destined for the CPE is routed using a router over the secondary channel when the signal strength of the MVDDS channel is below the threshold. More particularly, downstream communications may have previously been routed over MVDDS channel, but if MVDDS channel's signal strength is below a threshold, they may be instead routed over the secondary channel. This may be accomplished by adjusting routing data in a router. The router may be implemented using hardware or may also be implemented in software. For example, the router may be implemented using off-the-shelf router hardware or software. The router is configured to determine how to communicate data between the service provider and CPE and over which channel. More particularly, the router may be configured to route communications over the MVDDS channel and the secondary channel. The router is configured to route these communications based on configuration data accessible to the router. For example, the router may be configured with routing data. The routing data specifies how and under what circumstances data is routed over the MVDDS channel or the secondary channel. The routing data may be either stored inside of the router or accessible to the router via an external storage device or database.

In an exemplary embodiment, the routing data accessible to the router may be modified in real-time. More particularly, the routing data may be modified based on the status information received from the CPE. For example, if the signal strength of MVDDS channel is below a threshold, the routing data may be adjusted to route subsequent downstream communications over the secondary channel instead of the MVDDS channel. The routing data may be adjusted based on other factors, for example, the amount of traffic on secondary channel, or real-time bandwidth costs. If the throughput of the MVDDS channel is saturated, the routing data may be adjusted such that subsequent communications are routed over secondary channel.

The routing data may be adjusted in a number of ways. For example, the router may include an Application Programming Interface (API), which allows for such adjustments. Alternatively, the router may have other mechanisms that allow for such adjustments, for example, remotely or locally accessible shells, web interfaces, databases, or routing files.

In an exemplary embodiment, a database may store information related to all or a portion of CPEs connected to a service provider. The database stores identification information regarding CPEs that may be used to determined how to communicate with a particular CPE. For example, the database may store an IP address or other information which identifies how to contact a CPE (e.g. using a particular IP address). In addition, the database may store make/model information regarding a CPE, which may aid in determining the optimal method for retrieving status information from the CPE (e.g. SNMP or another method). Using the database, CPEs may be identified and contacted to retrieve status information. After the status information has been retrieved from a particular CPE, the status information may be recorded in the database and associated with that particular CPE. The status information may then be retrieved later by querying the database for the particular CPE.

In an exemplary embodiment, the router may be configured to determine routing data in real-time by querying the database. More particularly, when data reaches the router intended for a particular CPE, the data may be routed over the MVDDS channel or secondary channel based on the information stored in the database for that particular CPE. For example, the router may determine the proper route by querying a database for the status information associated with the particular CPE. If for example, the status information has a signal strength below a particular threshold, then the router may adjust the routing data to route communications over the secondary channel. Alternatively, the determination of how to route communications may be stored in the database after the status information has been retrieved.

Figure 4:
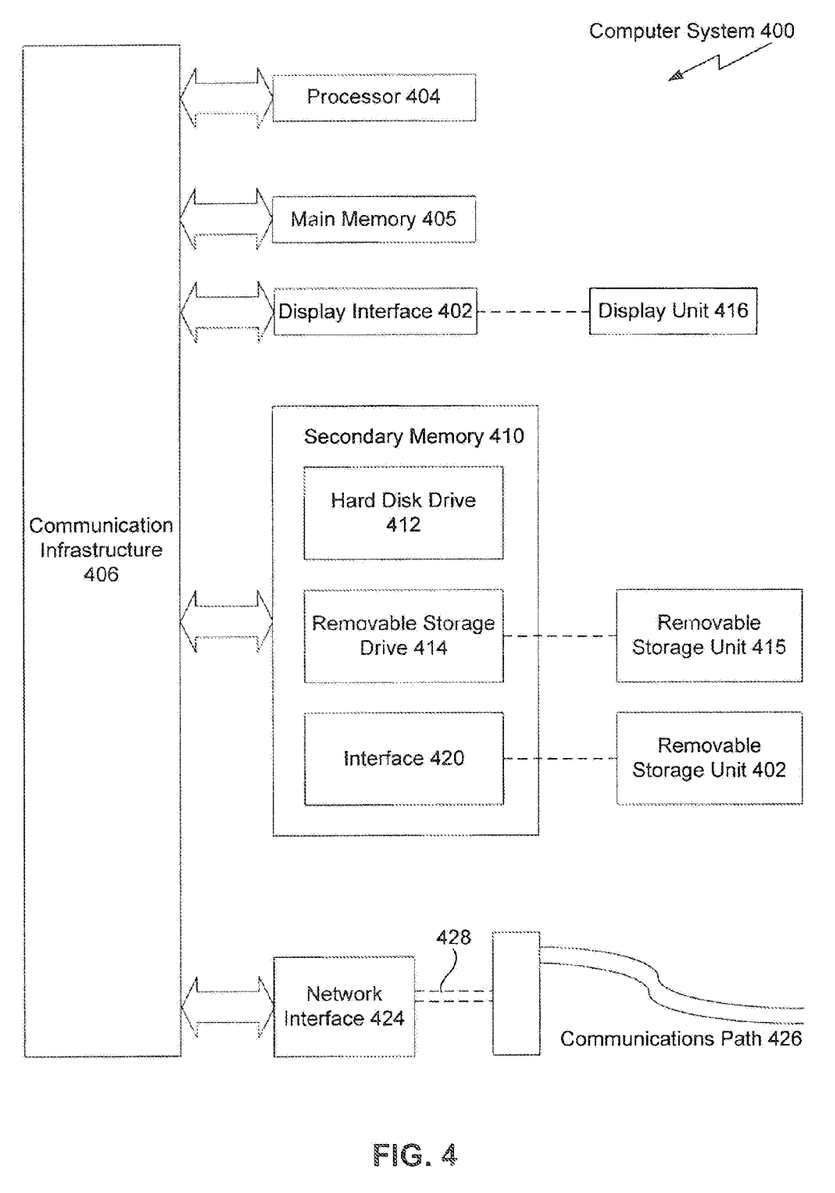
FIG. 4 illustrates an example computer system in which embodiments as described above, or portions thereof, may be implemented.

FIG. 4 illustrates an example computer system 400 in which embodiments as described above, or portions thereof, may be implemented. For example, system 100, dynamic router 210, or method 300, including portions thereof, may be implemented using computer system 400. Computer system 400 may use hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1, 2, and 3.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a physical memory may be used to implement the above-described embodiments. A processor device may be a single processor, a plurality of processors, or combinations thereof. Processor devices may have one or more processor "cores."

As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Various embodiments of the invention are described in terms of this example computer system 400. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Computer system 400 also includes a main memory 408, for example, random access memory (RAM), and may also include a secondary memory 410. Secondary memory 410 may include, for example, a hard disk drive 412 and removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored thereon computer software and/or data.

In alternative implementations, secondary memory 410 may include other similar storage means for allowing computer programs or other instructions to be loaded into computer system 400. Such storage means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 340.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, coaxial cable, hybrid-fiber coaxial, a phone line, a cellular phone link, an RF link or other communications channels.

In this document, the term "computer readable storage medium" is used to generally refer to media such as removable storage unit 418, removable storage unit 422, and a hard disk installed in hard disk drive 412. Computer readable storage medium may also refer to memories, such as main memory 408 and secondary memory 410, which may be memory semiconductors (e.g. DRAMs, etc.).

Some embodiments may be directed to computer products comprising software stored on any computer readable storage medium. Such software, when executed in one or more data processing devices, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments.

What is claimed is:

1. A method for dynamic routing, comprising:
   determining a communication method for a customer premises equipment (CPE);
   querying the CPE at predetermined intervals using the determined communication method to receive status information from the CPE, wherein the status information relates to a first channel;
   evaluating the status information to determine if data destined for the CPE over the first channel should be routed over a secondary channel; and
   routing data destined for the CPE over the secondary channel when the data is determined to be routed over the secondary channel;
   wherein if the status information is not received from the CPE within a predetermined amount of time after said querying, routing the data destined for the CPE over the secondary channel.

2. The method of claim 1, wherein the status information is received using the secondary channel.

3. The method of claim 1, wherein the determined communication method is simple network management protocol.

4. The method of claim 1, further comprising:
   identifying the CPE using a database, wherein the database further associates identification information with one or more CPEs;
   querying the CPE at predetermined intervals using the identification information associated with the CPE;
   receiving the status information based on the query; and
   associating the status information with the CPE in the database.

5. The method of claim 1, wherein determining the communication method further comprises:
   querying a database to determine the communication method, wherein the database associates a particular communication method from a plurality of communication methods with the CPE.

6. The method of claim 4, wherein evaluating the status information comprises:
   identifying the CPE to which the data is destined; and
   retrieving the status information associated with the CPE from the database.

7. The method of claim 1, wherein the secondary channel is a WiMAX channel.

8. A system for performing dynamic routing comprising:
   a heartbeater configured to:
     determine a communication method for a customer premises equipment (CPE); and
     query the CPE at predetermined intervals using the determined communication method to receive status information from the CPE, wherein the status information relates to a first channel;
   an evaluator configured to evaluate the status information to determine if data destined for the CPE over the first channel should be routed over a secondary channel; and
   a router configured to route data destined for the CPE over the secondary channel when the evaluator determines the data should be routed over the secondary channel;
   wherein if the status information is not received from the CPE within a predetermined amount of time after said query, routing the data destined for the CPE over the secondary channel.

9. The system of claim 8, wherein the status information is received using the secondary channel.

10. The system of claim 8, wherein the determined communication method is simple network management protocol.

11. The system of claim 8, further comprising a database configured to associate the status information with identification information of the CPE;
    wherein the heartbeater is further configured to:
        identify the CPE using the database;
        query the CPE at predetermined intervals using the identification information associated with the CPE; and
        associate the status information with the CPE in the database.

12. The system of claim 8, wherein to determine the communication method for the CPE, the heartbeater is further configured to query a database, wherein the database is configured to associate a particular communication method from a plurality of communication methods with the CPE.

13. The system of claim 11, wherein the router is further configured to:
    identify the CPE to which the data is destined, and
    retrieve the status information associated with the CPE from the database.

14. The system of claim 8, wherein the secondary channel is a WiMAX channel.

15. A computer-readable storage device, having instructions stored thereon that, when executed by one or more computing devices, cause the one or more computing devices to perform operations comprising:
    determining a communication method for a customer premises equipment (CPE);
    querying the CPE at predetermined intervals using the determined communication method to receive status information from the CPE, wherein the status information relates to a first channel;
    evaluating the status information to determine if data destined for the CPE over the first channel should be routed over a secondary channel; and
    routing data destined for the CPE over the secondary channel when the data is determined to be routed over the secondary channel;
    wherein if the status information is not received from the CPE within a predetermined amount of time after said querying, routing the data destined for the CPE over the secondary channel.

16. The computer-readable storage device of claim 15, wherein the status information is received using the secondary channel.

17. The computer-readable storage device of claim 15, wherein the determined communication method is simple network management protocol.

18. The computer-readable storage device of claim 15, the operations further comprising:
    identifying the CPE using a database, wherein the database associates identification information with one or more CPEs;
    querying the CPE at predetermined intervals using the identification information associated with the CPE in the database;
    receiving the status information based on the query; and
    associating the status information with the CPE in the database.

19. The computer-readable storage device of claim 15, wherein determining the communication method further comprises querying a database to determine the communication method for the CPE, wherein the database associates a particular communication method from a plurality of communication methods with the CPE.

20. The computer-readable storage device of claim 18, wherein evaluating the status information comprises:
    identifying the CPE to which the data is destined; and
    retrieving the status information associated with the CPE from the database.

\* \* \* \* \*